United States Patent [19]

Murphy

[11] Patent Number: 4,860,098

[45] Date of Patent: Aug. 22, 1989

[54] VIDEO DISCRIMINATION BETWEEN DIFFERENT VIDEO FORMATS

[75] Inventor: Richard L. Murphy, Grass Valley, Calif.

[73] Assignee: The Grass Valley Group, Inc., Nevada City, Calif.

[21] Appl. No.: 246,053

[22] Filed: Sep. 19, 1988

[51] Int. Cl.⁴ .............................................. H04N 5/05
[52] U.S. Cl. ................................... 358/139; 358/148; 358/188; 375/116
[58] Field of Search ............... 358/10, 17, 139, 141, 358/148, 154, 188; 375/116

[56] References Cited

U.S. PATENT DOCUMENTS

| | | | |
|---|---|---|---|
| 4,398,220 | 8/1983 | Satoh | 358/188 |
| 4,489,343 | 12/1984 | Hosoya | 358/188 |
| 4,763,341 | 8/1988 | Murphy | 375/116 |
| 4,785,350 | 11/1988 | Burdick | 358/139 |

*Primary Examiner*—Howard W. Britton
*Attorney, Agent, or Firm*—Francis I. Gray

[57] ABSTRACT

A video discriminator for automatically providing a format select indicator generates from the number of vertical sync pulses in a vertical interval of an input video signal and from the current state of the format select indicator an error signal if the number of vertical sync pulses is incompatible with the format select indicator. The error signal and a vertical sync detect pulse together with a horizontal line count determine the format of the input video signal and cause the format select indicator to change to reflect the format of the input video signal.

4 Claims, 5 Drawing Sheets

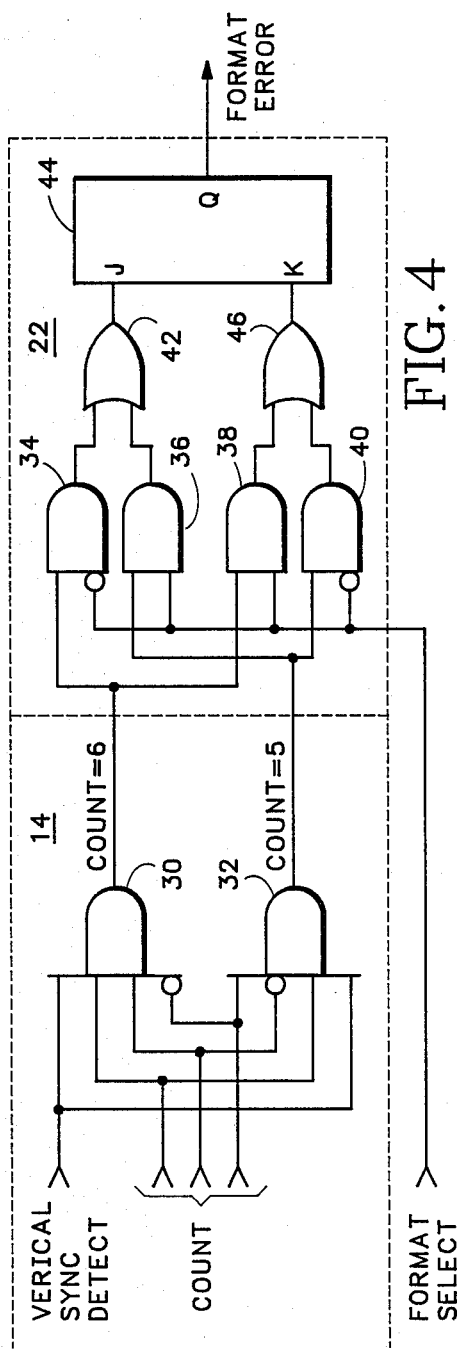
FIG. 4
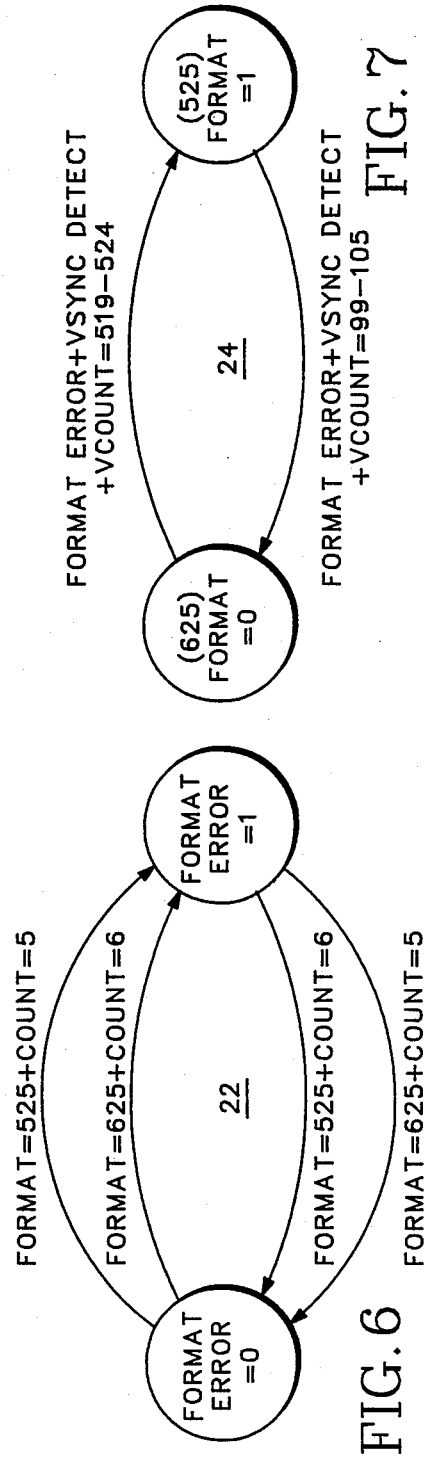
FIG. 7
FIG. 6

VIDEO DISCRIMINATION BETWEEN DIFFERENT VIDEO FORMATS

BACKGROUND OF THE INVENTION

The present invention relates to video data processing, and more particularly to a video discriminator for automatically determining the line rate of an input video signal and generating an appropriate format select signal.

Analog video that is applied to the input of a digital video processor may be in either the PAL or NTSC formats which have different line rates. The PAL line rate is 625 lines per frame, or 312.5 lines per field, and the NTSC line rate is 525 lines per frame, or 263.5 lines per field. As illustrated in FIGS. 1 and 2 the NTSC format has twenty lines of vertical blanking between fields, which includes a vertical interval signal. Likewise the PAL format has twenty-five lines between fields. During the vertical interval a plurality of sync pulses occur at twice the horizontal sync rate. Vertical sync is defined within the vertical interval by a plurality of wide sync pulses occurring in succession, six for the NTSC format and five for the PAL format.

Typically a television studio or production house would have separate equipment to process the different video formats. Currently with the establishment of various digital television video standards, such as the CCIR-601 and RP125 standards, video signals are converted to on of these digital standards for processing. The advent of more sophisticated digital video processors allows both formats to be input to the digital video processor so that video of both formats may be combined into a single output. However in order to switch between the input formats manual techniques, such as manual jumpers, switches and the like, are used to convert the equipment from one format processing to the other.

What is desired is a means for automatically discriminating between the two video formats so that a video processor can readily switch between the two formats without manual intervention.

SUMMARY OF THE INVENTION

Accordingly the present invention provides a video discriminator for automatically switching between different line rates using a two stage process. An input composite sync signal is derived from an input video signal, and a vertical interval discriminator determines from the input composite sync signal the number of vertical sync pulses within the vertical interval of the input composite sync signal. If the current line rate selected does not match the number of vertical sync pulses, then a format error signal is generated. The format error signal is combined with a vertical sync detect signal from the vertical interval discriminator that occurs at the conclusion of counting the number of vertical sync pulses. If the format error signal and the vertical sync detect signal occur together within a specified horizontal line count window derived from a timing generator, then a format select signal is generated accordingly for input to the first stage discriminator that provides the format error signal, and to the timing generator to synchronize the timing signals appropriately.

The objects, advantages and other novel features of the present invention are apparent from the following detailed description when read in conjunction with the appended claims and attached drawing.

BRIEF DESCRIPTION OF THE DRAWING

FIG. 4 is a schematic diagram of a first stage discriminator for the video discriminator of the present invention.

FIG. 6 is a state diagram for the first stage discriminator of FIG. 4.

FIG. 7 is a state diagram for the second stage discriminator of FIG. 5.

DESCRIPTION OF THE PREFERRED EMBODIMENT

Figure 1:
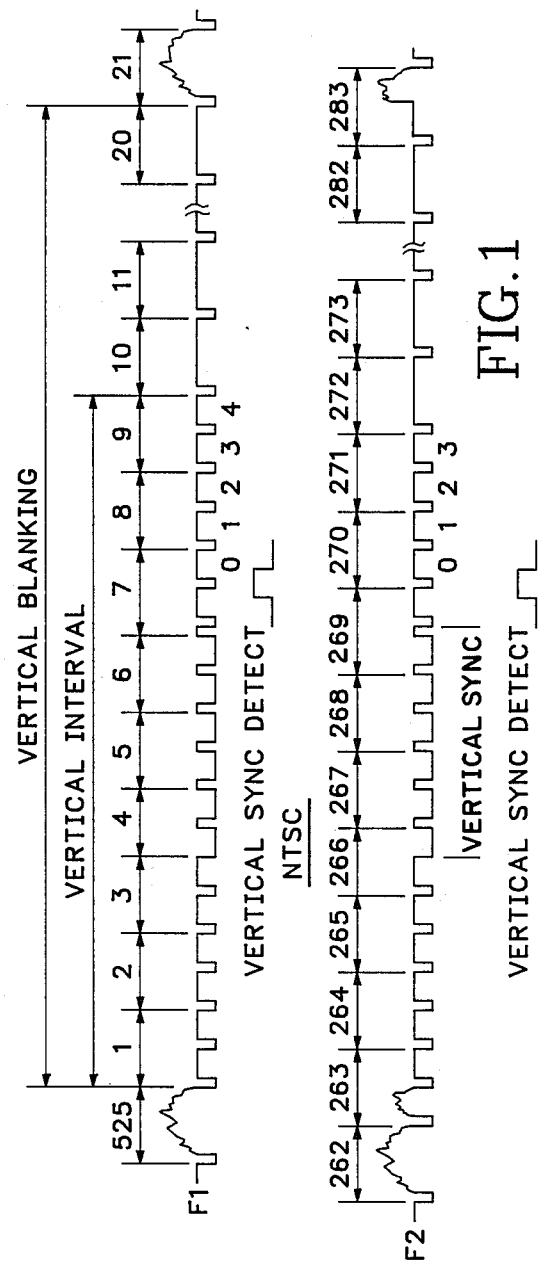
FIG. 1 is a timing diagram for an NTSC format video signal.
Figure 2:
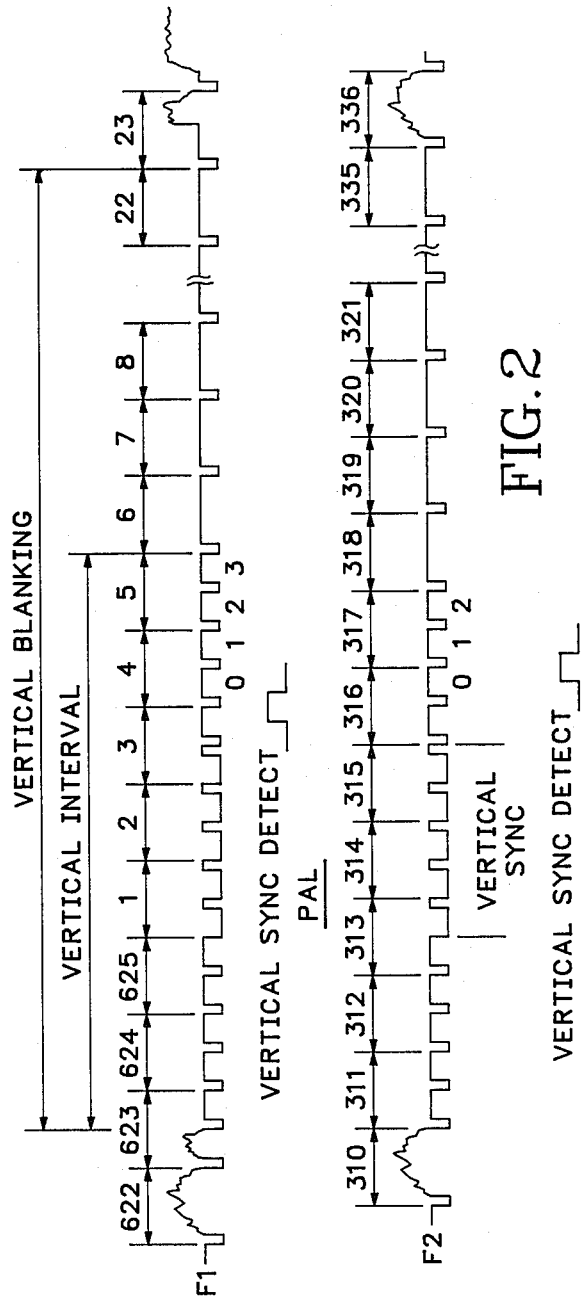
FIG. 2 is a timing diagram for a PAL format video signal.
Figure 3:
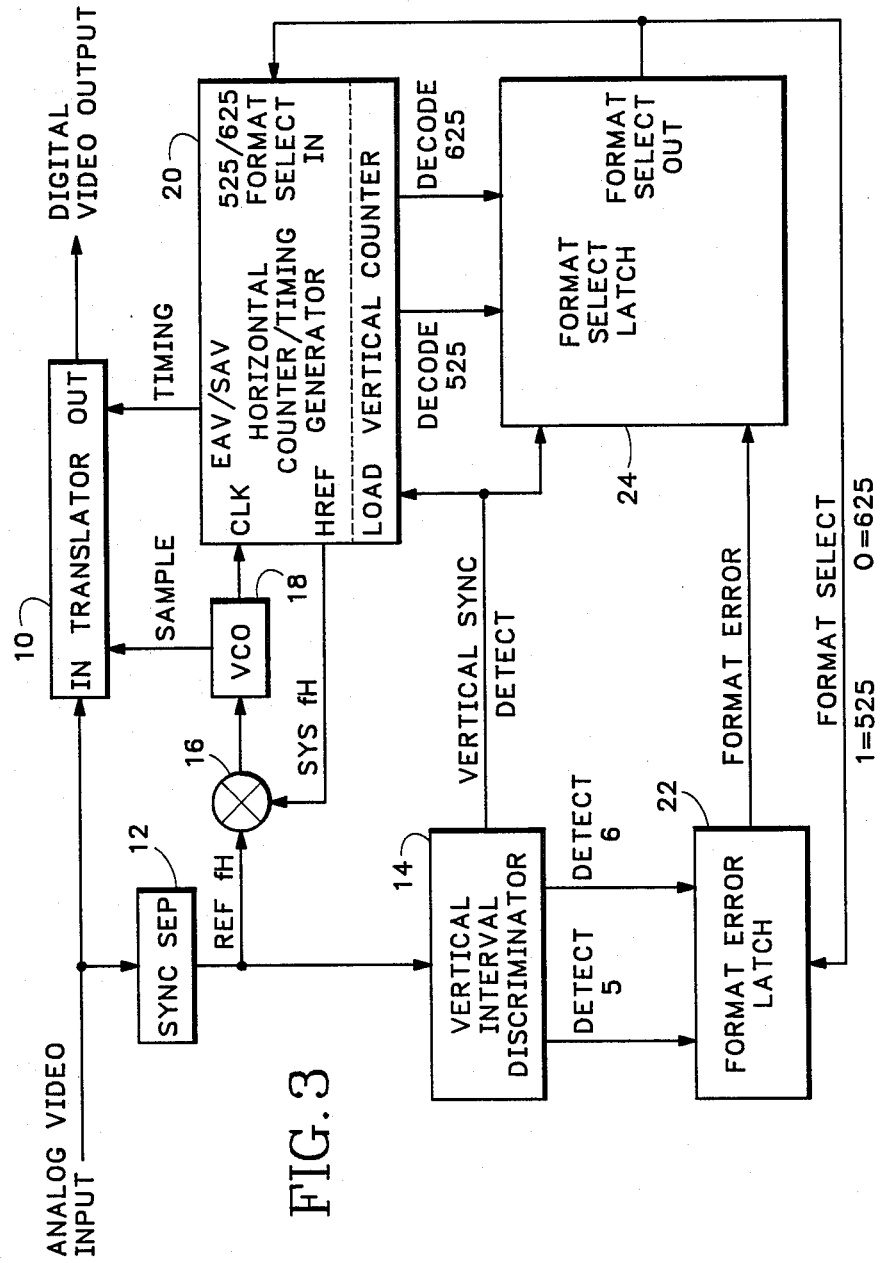
FIG. 3 is a block diagram of a video system incorporating the video discriminator according to the present invention.

Referring now to FIG. 3 an analog video signal in either the NTSC or PAL formats is input to a translator 10 to convert the analog video signal into a digital video signal that conforms to a designated digital standard, such as the CCIR-601 or Rp125 digital standards. The analog video signal also is input to a sync separator 12 to generate a composite sync signal from the analog video signal. The composite sync signal is input to a video interval discriminator 14, and to a phase detector 16 as a reference horizontal sync signal. The phase detector 16 is part of a phase lock loop for a voltage controlled oscillator (VCO) 18, the output of the phase detector providing a loop error voltage to the VCO to adjust the nominal frequency of the VCO. The VCO 18 provides sample pulses to the translator 10 for converting the analog video signal to a digital signal, and provides a clock signal to a combination horizontal counter/timing generator/vertical counter 20. The horizontal counter portion of the combination circuit 20 provides a system horizontal sync signal that is input to the phase detector 16 for comparison with the reference horizontal sync signal to generate the loop error signal to control the VCO 18. The timing generator portion of the combination circuit 20 provides appropriate timing signals to convert the digitized analog video signal into the designated digital format. The modulo of the horizontal counter portion of the combination circuit 20 is determined by a format select signal. For NTSC the modulo is 858 per horizontal line, and for PAL the modulo is 864 such that the product of the modulo and the corresponding nominal horizontal sync rate equals the nominal frequency of the VCO 18, i.e., for NTSC 858*15,734.263=13.499997 MHz and for PAL 864*15,625=13.5 MHz. The vertical counter portion of the combination circuit 20 receives an input clock from the horizontal counter portion at twice the system horizontal frequency and has a modulo of either 525 or 625 depending upon the format select signal so that the vertical counter recycles for each video field.

When in the PAL format if the analog video signal changes to NTSC with 525 lines instead of 625 lines, then the reference horizontal frequency is multiplied by 864 to produce a 13.594403 MHz frequency, an increase from the nominal VCO frequency of 94.403 kHz or a +0.7% offset in the horizontal counter rate. The vertical counter decodes the 525 lines faster than the actual 525 analog video signal line rate by 0.7%*525=3.67 lines or an offset of 3.67 counts in the vertical counter per video field when clocked at twice the horizontal line rate. If the VCO 18 is not able to lock or slew +0.7% in frequency, then the needed vertical count for the 525 line NTSC standard while in the 625 PAL format is ranged from 0 to −3.67 counts or more.

Likewise when in the 525 NTSC line format if the analog video signal changes to a 625 line PAL source before the format select signal changes, then the reference horizontal rate of 15.625 kHz for PAL is multiplied by the modulo 858 to produce a 13.40625 MHz frequency which is a decrease of 93.75 kHz or −0.7%. Thus the vertical counter decodes the 625 lines later than the actual 625 analog video signal line rate by an offset of −0.7%*625=−4.34 lines per frame or counts per field. Again if the VCO 18 cannot lock or slew −0.7% in frequency, the needed vertical count for the 625 line standard while in the 525 line format is ranged from zero to 4.34 or (525+100)=625 to (525+4.34)=629.34 counts or more.

The vertical interval discriminator 14, such as that disclosed in U.S. Pat. No. 4,763,341 issued on Aug. 9, 1988 to Richard L. Murphy entitled "Digital Timing Using a State Machine", counts the "broad" vertical sync pulses within the vertical sync interval and outputs the count to a first discriminator or format error latch 22. At the conclusion of the vertical sync pulses the vertical interval discriminator also outputs a vertical sync detect pulse that initiates the vertical counter portion of the combination circuit 20. The format error latch 22 compares the detected number of vertical sync pulses from the vertical interval discriminator 14 with the status of a format select signal. If the number of vertical sync pulses is not compatible with the status of the format select signal, the format error latch outputs a format error signal. The format error signal and the vertical sync detect pulse are input to a second discriminator or format select latch 24 together with a horizontal line count from the vertical counter portion of the combination circuit 20. If there is a format error and the count during the vertical sync detect pulse falls within one of the ranges defined above, then the format select signal is changed to reflect the change in input source format.

The vertical interval discriminator 14, as shown in FIG. 4, uses the vertical sync detect pulse and the vertical sync pulse count as inputs to a pair of AND gates, 30 and 32, to generate the decode 5 and decode 6 output signals, or count 5 and count 6, for input to the format error latch 22. The format select signal is input to respective AND gates 34, 36, 38 and 40, being inverted at the inputs of AND gates 34 and 40. The count 6 signal is input to AND gates 34 and 38 while the count 5 signal is input to AND gates 36 and 40. The outputs of AND gates 34 and 36 are input to a first OR gate 42, the output of which is connected to the J-input of a J-K type flip-flop latch 44. Likewise the outputs of AND gates 38 and 40 are input to a second OR gate 46, the output of which is connected to the K-input of the latch 44. The output of the latch 44 is the format error signal. For NTSC the vertical sync pulse count is six and the format select signal logic level is one, while the corresponding PAL values are five and zero. If the count is six while the format select level is zero, AND gate 34 outputs a pulse via OR gate 42 to the J-input of the latch 44 to set the format error signal. Likewise if the count is five while the format select level is one, AND gate 36 outputs a pulse via OR gate 42 to the J-input of the latch 44 to set the format error signal. In like manner if the count is six and the format select level is one or the count is five and the format select level is zero, respective AND gates 38 and 40 via OR gate 46 output a pulse to the K-input of the latch 44 to reset the format error signal or hold it reset.

Figure 5:
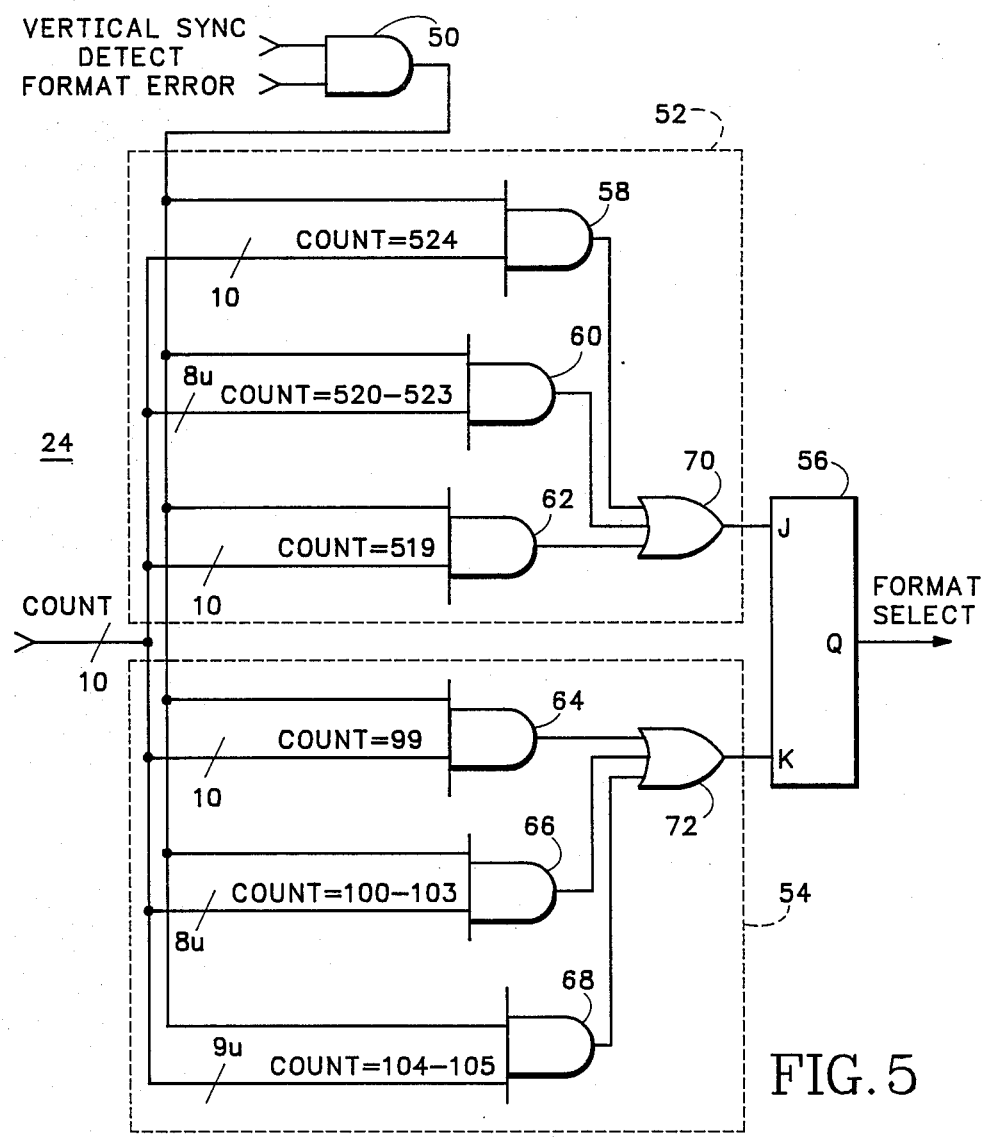
FIG. 5 is a schematic diagram of a second stage discriminator for the video discriminator of the present invention.

As shown in FIG. 5 the vertical sync detect pulse and the format error signal are input to an AND gate 50 within the format select latch 24. The output of the AND gate 50 and the horizontal line count from the vertical counter portion of the combination circuit 20 are input to a pair of window gates 52 and 54. When a format error is detected based upon the incompatibility of the vertical sync pulse count and the current status of the format select signal, the output of the AND gate 50 during the vertical sync detect pulse enables the window gates 52 and 54. If the count from the vertical counter is between 519 and 524 inclusive, then the output of the first window gate 52 applies a logical one to the J-input of an output latch 56 that is in the form of a J-K flip-flop to produce a logical one output for the format select signal indicative of a 525 line NTSC video signal source at the input. If the count from the vertical counter is between 99 and 105 inclusive, then the output of the second window gate 54 applies a logical one to the K-input of the output latch 56 to produce a logical zero output for the format select signal indicative of a 625 line PAL video signal source at the input. The window gates 52 and 54 may each be composed of a plurality of AND gates 58-62 and 64-68 to which the enable signal from AND gate 50 is applied as well as selected lines of the count from the vertical counter with appropriate inverters, as is well known in the art. The outputs of the respective sets of AND gates are input to respective output OR gates 70 and 72, the outputs of which are input respectively to the J-input and K-input of the output latch 56.

The operation of the respective format error and format select latches 22 and 24 are illustrated in the state diagrams of FIGS. 6 and 7. With no format error if the format select signal indicates 525 line format and the vertical sync pulse count is 5, or if the format select signal indicates 625 line format and the vertical sync pulse count is 6, then the format error signal is set to indicate the incompatibility between the selected line format and the vertical sync pulse count. The format error signal is reset or maintained reset when the format select signal indicates 525 line format with a vertical sync pulse count of 6 or indicates 625 line format with a vertical sync pulse count of 5. The switching of the format select signal between the two line formats is determined by the presence of a format error signal during a vertical sync detect pulse while the line count is within a given range, i.e., 519-524 to switch to 525 line format and 99-105 to switch to 625 line format.

Thus the present invention provides a video discriminator for automatically providing a format select signal that represents the format of the input video source by comparing the number of vertical sync pulses during a vertical interval with the currently indicated line format to generate a format error if they are incompatible, and then outputting a format select signal according to the line count from a vertical line counter that represents the format of the input video signal source.

What is claimed is:

1. A video discriminator for automatically providing a format select indicator representative of the format of a television standard video input signal comprising:
    means for determining the number of vertical sync pulses within a vertical interval of the video input signal and for providing a vertical sync detect pulse;
    means for generating a format error signal from the number of vertical sync pulses and the format select indicator; and
    means for changing the format select indicator in response to the format error signal, the vertical sync detect pulse and a horizontal line count between consecutive vertical sync detect pulses to reflect a change in format of the video input signal.

2. A video discriminator as recited in claim 1 wherein the generating means comprises:
    a first gate for generating an error output when the number of vertical sync pulses is incompatible with the format select indicator;
    a second gate for generating a reset output when the number of vertical sync pulses is compatible with the format select indicator; and
    a latch having the error output and the reset output as inputs and the format error signal as an output, the format error signal being set in response to the error output and being reset in response to the reset output.

3. A video discriminator as recited in claim 1 wherein the changing means comprises:
    an enable gate having as inputs the format error signal and the vertical sync detect pulse and as an output an enable signal;
    a first gate having the enable signal as one input and the horizontal line count as a second input to produce a first format select output;
    a second gate having the enable signal as one input and the horizontal line count as a second input to produce a second format select output; and
    a latch having the first and second format select outputs as inputs and the format select indicator as an output, the format select indicator being set to one state in response to the first format select output and to another state in response to the second format select output.

4. A method of automatically providing a format select indicator representative of the format of a television standard video input signal comprising the steps of:
    determining the number of vertical sync pulses within a vertical interval of the video input signal and providing a vertical sync detect pulse;
    generating a format error signal from the number of vertical sync pulses and the format select indicator; and
    changing the format select indicator in response to the format error signal, the vertical sync detect pulse and a horizontal line count between consecutive vertical sync detect pulses to reflect a change in format of the video input signal.

* * * * *